United States Patent [19]

Roncato et al.

[11] 4,406,196
[45] Sep. 27, 1983

[54] DEVICE FOR CUTTING CONTINUOUS THREADS, AND NOTABLY GLASS THREADS

[75] Inventors: Giordano Roncato, Aix les Bains; Jean Berlioz; Louis Roy, both of Chambery, all of France

[73] Assignee: Vetrotex Saint Gobain, Chamberg, France

[21] Appl. No.: 260,673

[22] Filed: May 5, 1981

[30] Foreign Application Priority Data

May 9, 1980 [FR] France .............................. 80 10376

[51] Int. Cl.³ .............................................. D01G 1/04
[52] U.S. Cl. ........................................ 83/117; 83/347; 83/913
[58] Field of Search ............... 83/913, 346, 347, 348, 83/117, 116; 30/128, 180

[56] References Cited

U.S. PATENT DOCUMENTS 3,353,431 11/1967 Mylo .
3,644,109 2/1972 Klink ........................... 83/348 X
4,083,279 4/1978 Western ........................ 83/348 X
4,249,441 2/1981 Sturtz ........................... 83/348 X

FOREIGN PATENT DOCUMENTS

1261537 4/1961 France .
1527836 6/1968 France .
2176580 2/1973 France .
2350932 9/1977 France .
1081710 8/1967 United Kingdom .

Primary Examiner—James M. Meister
Attorney, Agent, or Firm—Pennie & Edmonds

[57] ABSTRACT

A cutting device for cutting threads into predetermined lengths. The device has a first rotatable smooth faced drum and a second rotatable blade bearing drum having a plurality of radially extending circumferentially spaced cutting blades on the outer periphery thereof. Centrifugal force responsive means comprising fins connected to a deformable ring are positioned between the blades and on rotation of the drums act to press a thread onto the smooth faced drum. The blades are connected to the blade bearing drum only at their ends.

14 Claims, 6 Drawing Figures

Fig. 6

DEVICE FOR CUTTING CONTINUOUS THREADS, AND NOTABLY GLASS THREADS

TECHNICAL FIELD

The invention relates to a device for cutting threads made of organic or mineral material into sections, and in particular glass threads or slivers occurring in the form of separate filaments.

More particularly, the invention relates to a cutting machine comprising a bearing member and a blade-bearing drum designed for cutting threads into sections having a regular length.

BACKGROUND ART

Devices have hitherto been used for cutting a filamentous material into sections having a constant length by causing the material to pass between a bearing drum and a drum bearing blades arranged perpendicularly to the bearing drum with the cutting edges of the blades projecting radially outwardly.

However, glass slivers or threads have fairly low cohesion and, as a result, the filaments which make up the threads readily separate from one another during the operation of cutting. The thread, in fact, being wedged between the cutting edges of the blades and the surface of the bearing member, undergoes a flying-buttress effect that causes it to disintegrate. A certain number of cut filaments then rapidly form a sizable quantity of fuzz, which fills the spaces separating the blades and tends to cause irregular cutting. Solutions have been proposed for remedying this drawback as illustrated by U.S. Pat. No. 3,555,947 and French Pat. No. 1261537.

The U.S. patent discloses a blade-bearing drum cooperating with the surface of a bearing drum and equipped with projecting blades uniformly spaced on its periphery and with ejection fins placed between the blades. The ejection fins, which are capable of moving radially outwardly with their movement being limited by stops located at their two ends, eject the thread sections immediately after they are cut, by the effect of centrifugal force and thus prevent the formation of fuzz. This device yields satisfactory results provided that the thread speed is no greater than a few meters per second. For higher speeds, the centrifugal force becomes such that it often causes the breaking of the ejection fins.

The French patent discloses another device also including a blade-bearing drum. The drum is equipped with blades arranged radially and embedded in an elastomer covering which covers the entire surface of the drum. The surface of the bearing drum is coated with an elastomer that is substantially harder than the elastomer covering the surface of the blade-bearing drum. A thread is moved by being pinched between the elastomer surfaces and then brought into the cutting zone proper. The spacing between the bearing drum and the blade-bearing drum is adjusted in such a way that the elastomer of the bearing drum compresses and radially deforms the elastomer layer lining the surface of the blade-bearing drum inwardly.

This deformation has the effect of causing the cutting edges of the blades to protrude beyond the surface of the elastomer layer and thus cut the thread. Where the thread emerges from the cutting area, the elastomer lining the surface of the blade-bearing drum resumes its initial shape and ejects the section of thread. Here again the cutting speed is necessarily low due to the fact that as soon as it goes beyond a few meters per second, the rapid and violent deformation of the elastomer located on the surface of the blade-bearing drum heats the elastomer to such an extent that it rapidly degrades.

The devices described above can only cut filamentous material supplied in the form of coils of threads or slivers manufactured in accordance with classic procedures which is a costly process due to the fact that it requires the coiling and then the uncoiling of the thread. This results in sizeable handling costs and excessive thread losses because of the various handling operations.

It is consequently advantageous to produce threads in a single operation including the steps of drawing the thread from a number of forming dies and then cutting the thread into segments. This process, which is commonly called "direct cutting under spinneret" is implemented by means of a device which can perform both the functions of forming and cutting. Such a device is disclosed in French Pat. No. 2 253 718.

According to this patent, a filament is drawn by being pinched between two wheels the surfaces of which have a contact area with the first wheel, or pressure roller, having a knurled surface and the second wheel, or bearing drum, having a flexible smooth surface. Upon issuing from the contact or pinching area, the thread is driven by the bearing drum toward a cutting area formed by the contact between the drum and a third wheel, or blade-bearing drum, which is provided with a series of projecting blades mounted in slots provided in its surface.

This type of device has a number of drawbacks. In the first place, the compression which the thread undergoes between the pressure roller and the bearing drum has the effect of diminishing its cohesion, and consequently that of the cut fibers. This then results in that each cut fiber comprises a certain number of filaments that stand out to a greater or lesser extent from its surface. Cut fibers exhibiting this defect easily become caught and do not lend themselves to easy handling. Furthermore, the lack of cohesion of the fibers renders them unsuitable for certain applications.

The compresson of the thread also produces an oily deposit on the surface of the pressure roller tending to smooth it out. The thread will then tend to wind around the pressure roller a phenomenon which interrupts the operation of the device.

Whenever the rotational speed of the bearing drum and the blade-bearing drum is high, another drawback appears resulting from the impact of the blades against the bearing drum. The further out the blades project, the more difficult it is to eliminate this problem. This impact causes vibrations, the consequences of which are very rapid wearing of the blades and of the liner of the bearing drum and also a very noisy operation, which constitutes a considerable nuisance.

It is therefore an object of the invention to provide for a cutting device which, while it is capable of performing a drawing function and is fed with threads coming from one or more forming dies, also makes it possible to cut sections of the thread to a predetermined length, to eject the sections safely and completely, to counter the formation of fuzz between the blades, to prolong the life of the mechanical members of the device and to effect a substantial reduction in the noise level due to the operation of the device.

DISCLOSURE OF INVENTION

A device in accordance with the invention includes a bearing member in the form of a rotatable drum and a further drum rotatable about an axis parallel to that of the bearing member and having on its periphery a multiplicity of fixed cutting blades separated by a series of movable elements positioned between the cutting blades.

In accordance with an important characteristic of the invention, the cutting blades are joined to the blade-bearing drum at their ends only, such that their bases opposite their cutting edges remain entirely free from any contact with the blade-bearing drum. Movable elements in the form of fins of a deformable fin ring are located between the cutting blades with the fin ring being placed behind the median portion of the blades and having its axis coincide with the axis of rotation of the blade-bearing drum.

According to another feature of the invention, the fin ring is monolithic, i.e., cast in a single piece.

Other characteristics and advantages of the invention will become clear from the description which follows, and which relates to an embodiment of the device in accordance with the invention, this embodiment being given by way of example.

BEST MODE FOR CARRYING OUT THE INVENTION

Figure 1A:
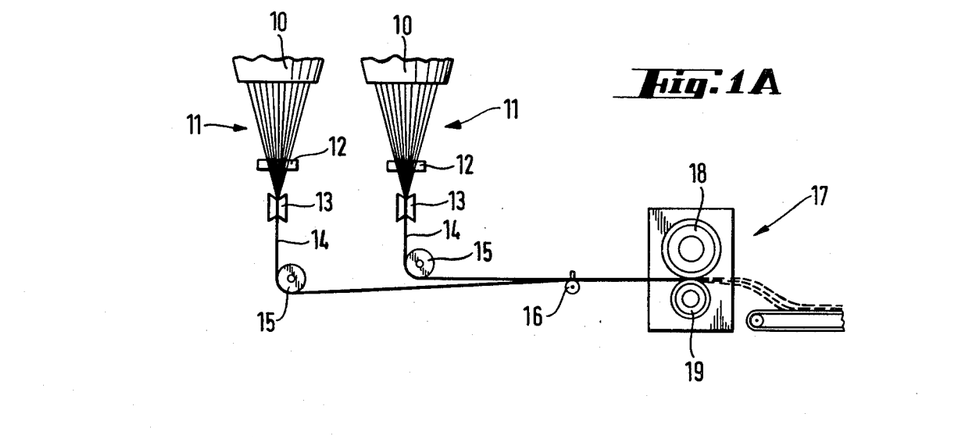
FIGS. 1A and 1B are schematic views of the general layout of a device according to the invention and of the equipment which is associated with the device for drawing continuous filaments of glass from a multiplicity of sources and bringing the filaments to the device.
Figure 1B:
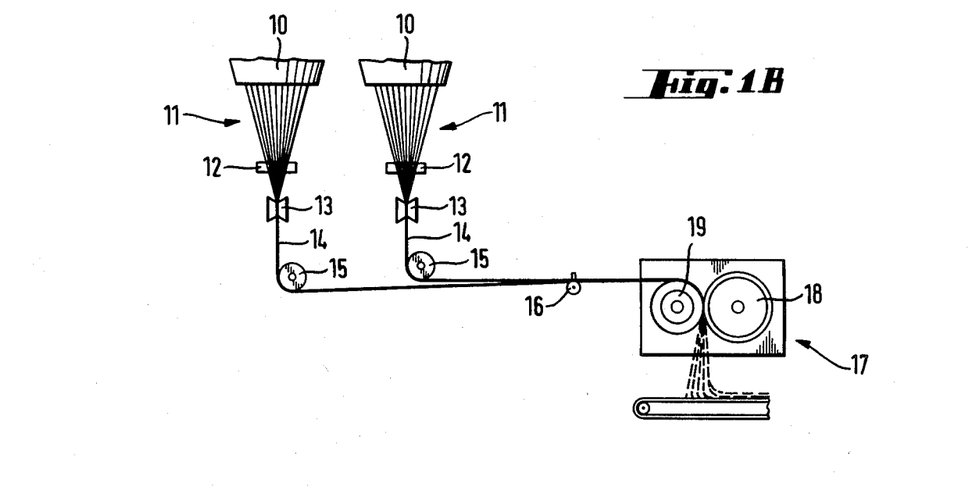

The production line as shown schematically in FIGS. 1A and 1B comprises in the upline portion at least one spinneret 10 fed with molten glass or glass marbles by means of a feeding system which is not illustrated.

The spinnerets or forming tips 10, generally made of rhodium platinum and heated by Joule effect, are provided on their lower portion with a plurality of orifices from which a plurality of filaments 11 are mechanically drawn. These filaments, forming at least one lap, are coated with a lubricating sizing agent, by a process commonly called oiling or greasing, by being passed over a coating device 12 before being combined in the form of strands or threads by means of assembling rollers 13. The formed threads 14 are then led by means of guide pulleys 15 to a guiding device 16, such as a comb, for example, before being introduced into the cutting device 17 comprising a bearing drum 18 and a blade-bearing drum 19.

According to FIGS. 1A and 1B, drawing is achieved by the mere action of the cutting device, the operation of which will be described hereinafter. Drawing could also be achieved by means of an auxiliary drawing device, located up the line from the cutting device, such as those drawing devices described in U.S. Pat. No. 3,873,290.

The cutting device in accordance with the invention can be set up in different ways, the particular way in which it is arranged being dependent on the means employed up the line for guiding and drawing the threads as well as on the layout of the device for receiving the cut threads.

FIGS. 1A and 1B show, respectively, by way of examples, two classic arrangements whereby it is possible either to project the cut threads laterally (horizontal cutting) or to project them vertically.

Figure 2:
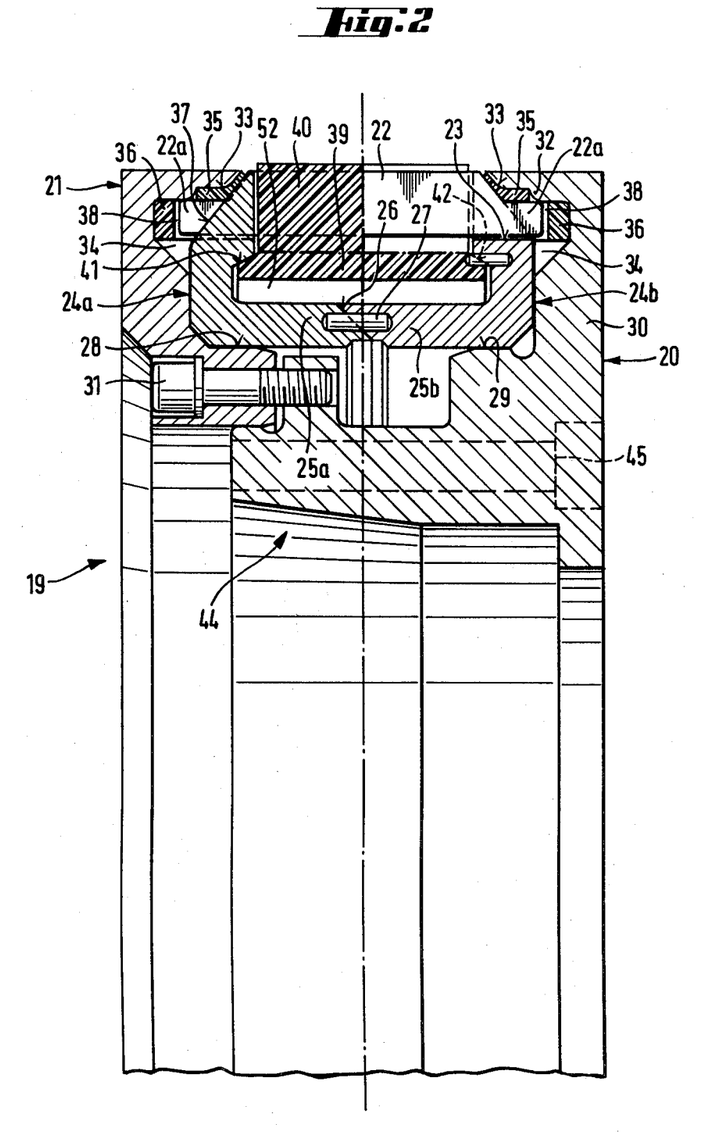
FIG. 2 is of two axial half-section views of a portion of the blade-bearing drum constructed according to the invention.
Figure 3:
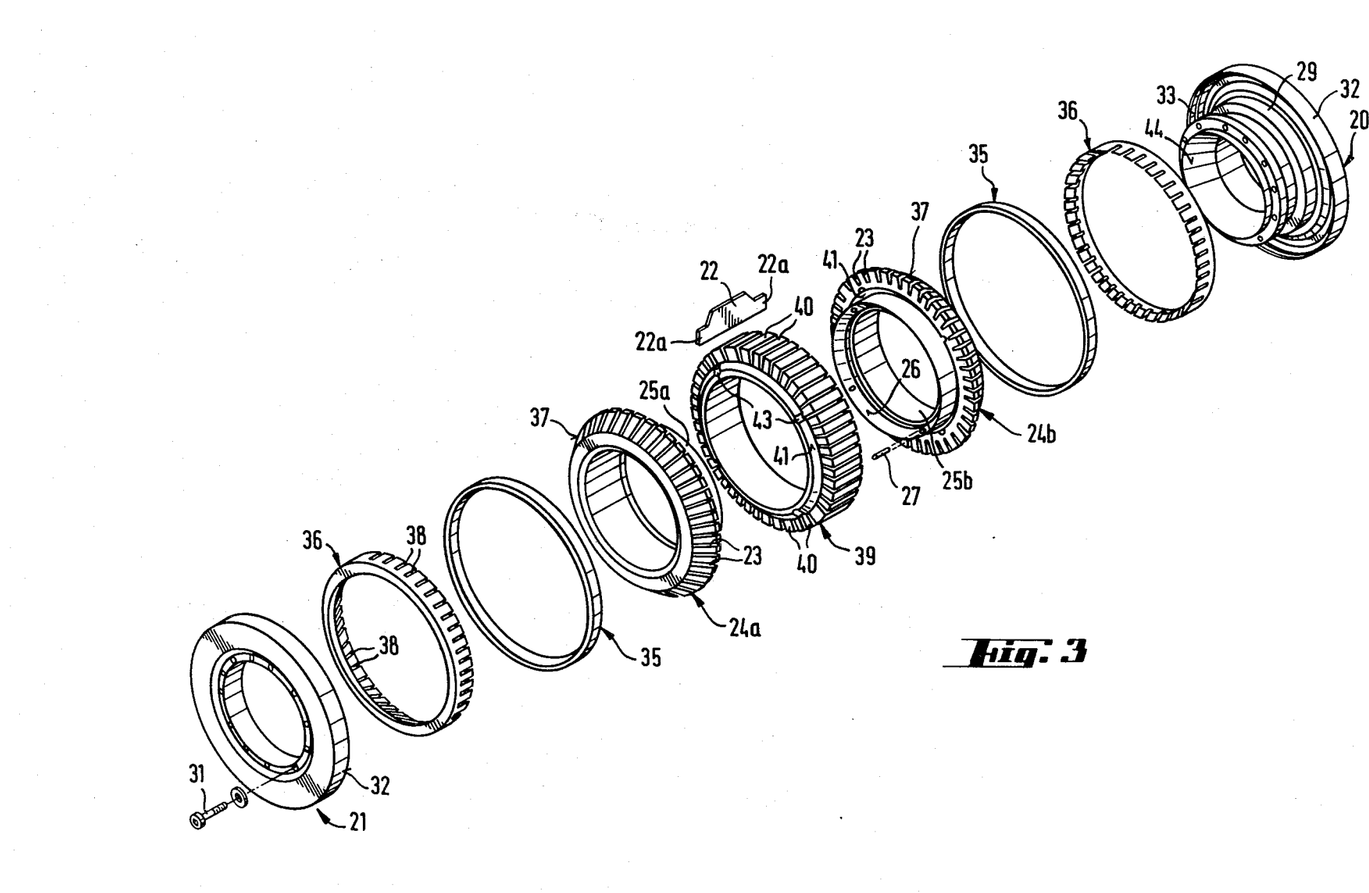
FIG. 3 is an exploded view in perspective of the various parts constituting the blade-bearing drum of FIG. 2.

The structure of the blade-bearing drum 19 and that of the bearing drum 18 are illustrated in FIGS. 2 and 3. The blade-bearing drum 19 comprises a hub 20 and a clamp 21 enclosing different fixation elements of the cutting blades 22.

The cutting blades 22, which have an end-portion or lug 22a at each end, are inserted into radial slots 23 in flanges 24a and 24b of two rims 25a and 25b. Rims 25a and 25b are assembled over one another by means of a conical surface 26 and positioned angularly face-to-face by means of a pin 27. The height of the radial slots 23 is smaller than the height of the flanges 24a and 24b. This makes it possible to maintain an empty space between the bases of the blades 22 which are inserted in the slots and the upper surfaces of the rims 25a and 25b. The rims 25a and 25b are mounted concentrically with respect to the axis of rotation of the drum 19 by means of the bearing surfaces 28 and 29. The rims are further pressed against one another by the action of the flange 30 of the hub 20 and the clamp ring 21 being pressed tightly together by the screws 31.

The hub 20 and the clamp 21 each have a lip 32 provided with a face 33 on the internal surface thereof as well as a groove 34. Flexible rings 35 are positioned between the faces 33 and the upper edges of the lugs 22a of the cutting blades.

In addition, a pair of flexible cheeks 36, which are annular in shape and slotted as illustrated in FIG. 3, are placed at the back of the grooves 34 so that the ribs between their slots enter the free spaces located between the lugs 22a of the blades.

When the hub 20 and the clamp 21 are tightened together by means of the screws 31, the rings 35 are compressed and as a result hold the blades 22 in the bottoms of the radial slots 23 in the flanges 24a and 24b.

Due to the effect of the tightening of screws 31, the cheeks 36 are squeezed between the bottoms of the grooves 34 and the oblique surfaces 37 of the flanges 24a and 24b. The depth of the slots is such that a free space 38 is generally left between the ends of the lugs 22a and the bottoms of the slots. This arrangement makes it possible to hold the blades tightly in place while tolerating slight differences in blade dimensions.

Flexible ring member 39 having radial extensions 40 is also placed under and between the blades 22. The member 39, situated under the blades, comprises a ring having bevelled edges 41' which fit exactly with the conical bearing surfaces 41 of the flanges 24a and 24b as shown in FIG. 2. The extensions 40 are integral with the ring 39 and project radially outwardly on the upper surface thereof in the form of fins positioned with the same pitch as the blades 22 and housed, with a certain degree of play, in the free spaces existing between the blades. The ring member 39 and extensions 40 thus form a deformable fin ring which is preferably formed in a single piece. The ring member 39, which is freely mounted without any fastening, is angularly positioned by means of snugs 42 which fit into notches 43 and it is non-rigidly centered by means of the bevel surfaces 41' cooperating with the conical bearing surfaces 41 of the flanges 24a and 24b.

From the manner of assembly described above, it is seen that the blades 22 are held only at their ends by means of flexible contacts against the rigid contacts constituted by the bottoms of the radial slots in the flanges 24a and 24b.

The blade-bearing drum thus assembled is mounted on a rotatable shaft, not illustrated, and is centered on the shaft by means of a cone 44. The blade-bearing drum is fixed on the shaft by screws 45. The axis of rotation of the fin ring thus coincides with its axis of rotation of the shaft.

The annular members 35 and 36, the ring member 39 and its fins 40 are preferably made of an elastomer, such as, for example, polyurethane having a Shore hardness (scale A) ranging from 80 to 100.

Figure 4A:
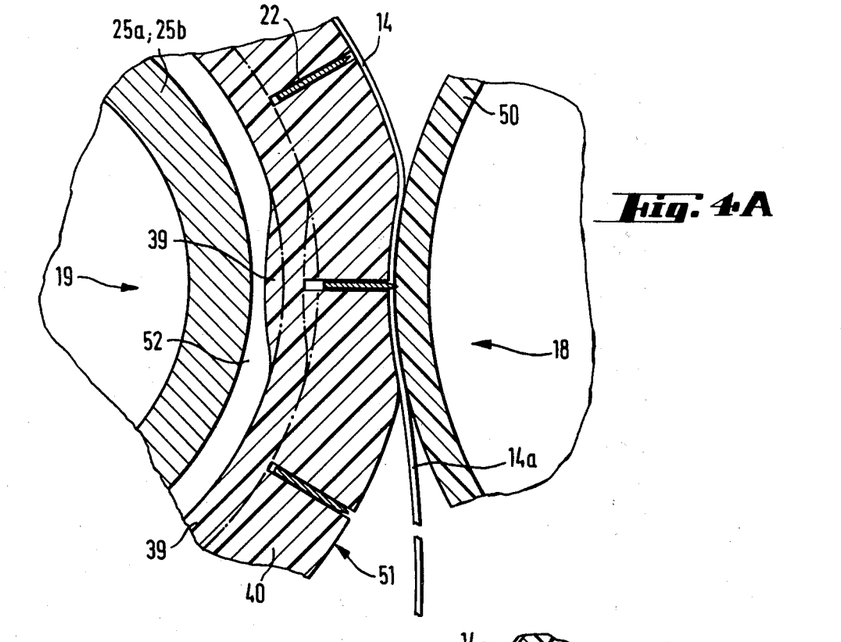
FIGS. 4A and 4B are schematic partial sections of two embodiments of the blade-bearing drum taken along a plane perpendicular to the axes of rotation of the drum.
Figure 4B:
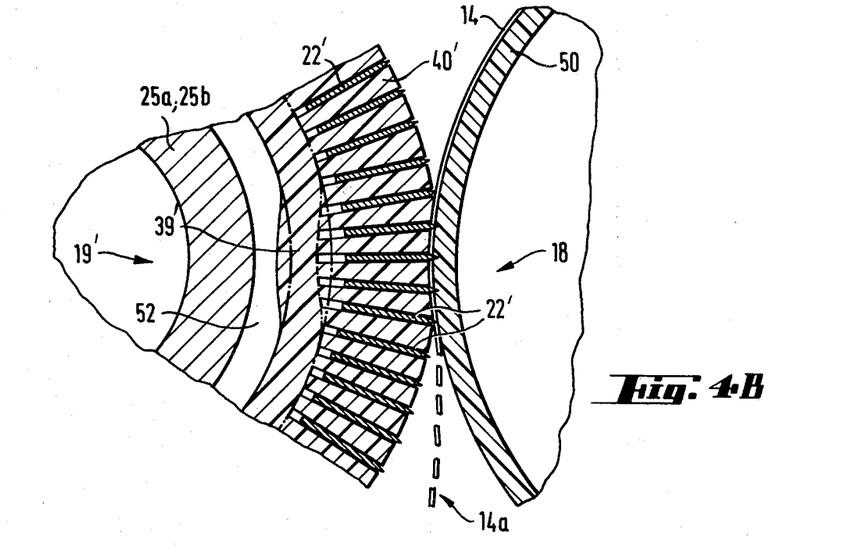
Figure 5:
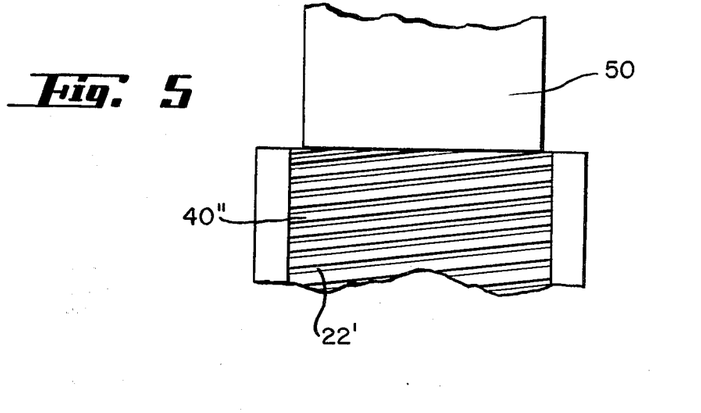
FIG. 5 is a plan view of a portion of a blade drum having blades inclined to the axis of rotation and a portion of a bearing drum; and, FIG. 6 is a schematic partial section of a further embodiment of a blade bearing drum taken along a plane perpendicular to the axis of rotation of the drum and in which blades having cutting edges are separated by blades having no cutting edge.

The operation of the cutting device in accordance with the invention is illustrated by FIGS. 4A and 4B. As can be seen from FIGS. 1A and 1B, the blade-bearing drum 19 cooperates with a rotating bearing drum 18. The surface of the latter is covered with a flexible layer 50 made of an elastomer, such as, for example, polyurethane identical with that constituting the previously described fin rings 39. The distance separating the axes of rotation of the drums 18 and 19 is adjusted in such a way that the cutting edges of the blades penetrate the lining 50 of the bearing drum to a shallow depth.

It will be noted that the diameter of the fin ring 39 is such that, when the cutting device is stopped, the radially outer surfaces of the fins do not extend beyond the level of the cutting edges of the blades. The driving motion is preferably imparted to the blade-bearing drum 19, which causes the bearing drum 18, which is mounted loose on its axis, to rotate. The motion is transmitted simultaneously by the action of the fins 40 on the lining 50 and by the engagement resulting from the slight penetration of the blades 22 into the liner of the drum 18.

FIG. 4A illustrates the operation of one of the variants of the device in accordance with the invention, adapted for the manufacture of pieces cut fairly long. As shown, the drum 19 comprises a fin ring 39 the upper surfaces of the fins of which reach the level of the blade cutting edge when the drum is stopped. When the drum 19 reaches its normal rotating speed, the ring 39 and the fins 40 will undergo a slight radial expansion induced by centrifugal force and, due to this effect, the succession of upper surfaces of the fins then forms a near-continuous cylindrical revolutional surface 51, the radius of which is greater than that of a concentric circle passing through the apices of the cutting edges of the blades 22.

The drum 19 also comprises blades the circumferential spacing of which is such that the cutting is done by a single blade at a time. Depending upon the layout of the cutting device, the thread or threads may reach the cutting area directly (FIG. 1A) or after having covered a winding arc on the surface of the blade-bearing drum 19 (FIG. 1B). It is quite obvious that the thread can be wound previously on the drum 18, if the positions of the drums 18 and 19 as shown in FIG. 1B are reversed.

In the first case, the surface 51 and that of the liner 50 come into contact, pinch the thread or threads and cause them to be drawn, prior to their being cut, in a single action. In the second case, also illustrated by FIG. 4A, the thread 14 is moved along by effect of its being pinched and the additional effect of traction resulting from its adherence to the surface 51 (or that of the lining 50).

In the cutting zone proper, the fins 40 are pushed inward due to the effect of the pressure exerted by the surface of the bearing drum. Due to this action, the annular portion 39 of the fin ring is radially deformed inwardly and is moved away from the conical bearing surfaces 41 in the space located above the rims 25a and 25b. This results in the fins 40 gradually freeing the cutting edge of a blade 22 which, penetrating the lining 50, thus cuts the thread 14 and gives rise to a strand or segment 14a. Upon leaving the cutting zone, the segment is ejected by the fins 40 which gradually reemerge due to the effect of centrifugal force.

In this variant, the rotational drive of the drum 18 by the driving drum 19 is accomplished essentially by the close cooperation of the surface 51 with that of the lining 50. This results in compression of the cut segment 14a which is attenuated by the radial retraction of the fin ring 39 and is not great enough to be detrimental to its integrity.

Referring to FIG. 4B in which like parts have like numerals, there is illustrated the operation of a further variant of the device in accordance with the invention adapted for cutting a thread into sections 14a' having a short length and in which the spacing of the blades 22' is such that cutting is done simultaneously by at least two blades.

The integrity of the cut sections 14a' is all the more difficult to maintain as the points of contact between the different elementary filaments forming the strand or thread grow less numerous, which is particularly the case when the length of the strands is reduced. The loss of cohesion can occur either as a result of the crushing of the strand between the two surfaces tightly pressed against one another or as a result of shearing which takes place when a strand is cut which is not adequately held in place during the cutting operation.

It is thus necessary to avoid excessive squeezing of the strand between the upper surfaces of the fins 40' and the surface of the lining 50 while at the same time avoiding any absence of contact between these two surfaces. Both of these cases are extreme conditions in which a certain number of elementary filaments would separate from the cut strands resulting in the formation of fluff and the rapid fouling of the device.

In this variant of the invention, the fin ring 39' is selected in such a manner that even after the radial expansion induced by the centrifugal force, the radially outer surfaces of the fins 40' describe a circle the radius of which is slightly smaller than that of the concentric circle passing through the apices of the cutting edges of the blades 22'.

Depending upon the layout of the cutting device, the thread or threads may come into the cutting zone directly or after having covered a winding arc on the surface of the bearing drum 18. Prior winding on the surface of the blade-bearing drum 19' is to be avoided inasmuch as the cutting edges of the blades extend slightly beyond the cylindrical surface of revolution described by the upper surfaces of the fins. In the former case it is necessary to use an auxiliary drawing means located up the line from the cutting mechanism. In the second case, illustrated by FIG. 4B, the thread 14 may possibly be drawn merely by the traction resulting from its adherence to the surface of the lining 50.

In the cutting area proper, the thread 14 comes into contact with the cutting edge of a first blade, and is then trapped and held between the surface of the lining 50, the upper surface of a fin 40' and the following blade which begins the cutting of the strand section. Upon coming into contact with the lining 50, the fins 40' are pushed back into the free space 52, although to a lesser degree and under less pressure than in the first embodiment. The cut segment 14a' is thus simply held pressed between the two elastomer surfaces and maintains its complete integrity. As it leaves the cutting area, the fins 40' emerge again and eject the cut strands 14a'.

In this embodiment the rotational driving of the drum 18 by the driving drum 19' is accomplished substantially by the penetration of the blades 22' into the lining 50. For this reason it may also be advantageous to use a blade-bearing drum provided with blades positioned perpendicularly to its periphery and inclined with respect to its axis of rotation at an angle ranging from 10° to 30°.

From the preceding description it is seen that the cutting device is adjusted in such a way that the cutting blades penetrate to a shallow depth into the lining of the bearing drum, this adjustment being corrected each time that any deterioration of the surface of the lining requires new machining. Depending upon this adjustment, the characteristics of the fin ring, and chiefly the difference between the radii of the concentric circles described by the upper surfaces of the fins and the apices of the cutting edges of the blades, must be selected according to the desired length of the cut segments. This difference is of the order of a few tenths of a millimeter, as, for example, from $-2/10$ to $+3/10$ of a millimeter, taking the radius of the circle passing through the apices of the cutting blades as the reference radius.

In addition to the length of the cut segments it is quite obvious that other parameters, such as, for example, the degree of humidity of the thread or the diameter of the filaments constituting the said thread, will also have to be taken into consideration for selecting the particular fin ring best suited for the manufacture contemplated.

The system in accordance with the invention combines numerous advantages, including, in particular, the following:

The possibility of effecting the cutting of several glass threads drawn from several spinnerets at linear drawing speeds of several tens of meters per second.

The fin ring makes it possible to maintain the integrity of the sections of thread and to eject them outside of the cutting area.

The fin ring makes it possible to prevent the clogging of the blade-bearing drum.

The blade-bearing drum, which is a driving element and maintains a constant diameter, avoids changes in the adjustment of the rotational speed.

The blade-bearing drum is easy to mount and dismount, whenever it is necessary to change one or more blades.

The structure of the blade-bearing drum has the further advantage that it is possible to modify the length of the sections of thread by a quantity that is a multiple of the pitch of the slots containing the blades.

Figure 6:
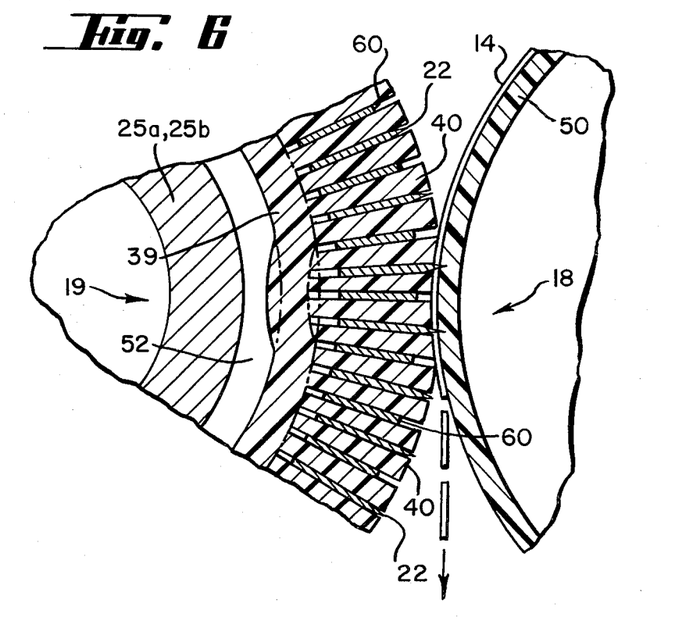

Referring to FIG. 6 in which like parts have a like identifying numerals, it is seen that for a given fin ring, it is easy to adjust the length cut thread by inserting, between two successive cutting blades, one or more blades 60 which do not have any cutting edge and which have a height such that they do not touch the surface of the bearing drum in the cutting area. The purpose of inserting these blades is to maintain the fin ring in place and to prevent any large deformations that would cause it to break.

In the extreme case it is possible to equip the blade-bearing drum with a single cutting blade and thus obtain segments the length of which is equal to the circumference of the said drum. More commonly, one can obtain without difficulty, starting with threads drawn at speeds ranging between 30 and 50 meters per second, segments the length of which may vary from 3 millimeters to approximately 50 millimeters.

We claim:

1. A cutting device for cutting threads into sections of predetermined length with said device having a bearing member in the form of a rotatable smooth faced drum and a blade bearing drum rotatable about an axis parallel to the axis of rotation of the smooth faced drum and having radially outwardly extending cutting blades positioned on the outer periphery thereof and having centrifugal force responsive members positioned between circumferential adjacent blades adapted to press a thread into contact with said smooth faced drum, characterized in that said blades are connected to said blade bearing drum only at their ends whereby the bases of the blades opposite their cutting edges are free, in that said centrifugal force responsive members comprise fins connected to a deformable ring positioned beneath the bases of the blades with the center of the ring being concentric with the axis of rotation of the blade bearing drum, and in that the outer periphery of said fins are adapted to be moved radially outwardly of the blade bearing drum under the influence of centrifugal force and are adapted to be moved radially inwardly of the outer periphery of said blades against said centrifugal force by contact with said smooth faced drum.

2. A device according to claim 1, further characterized in that the ring and the fins form a monolithic fin ring.

3. A device according to claim 2, further characterized in that the ring and the fins are made of an elastomer having a Shore hardness A that falls within the range from 80 to 100.

4. A drum according to claim 1, further characterized in that the blade bearing drum has two facing rims mounted concentrically therewith wherein each rim has a slot therein into which an end of a blade is inserted.

5. A device according to claim 4, further characterized in that said blade bearing drum has a free space between the bases of the blades and the upper surfaces of the rims.

6. A device according to claim 5, further characterized in that the deformable ring is placed radially in said free space.

7. A device according to claim 4, further characterized in that the ring has beveled edges which cooperate with conical bearing surfaces provided on the inner surfaces of the flanges.

8. A device according to claim 1, further characterized in that during operation the upper surfaces of the fins describe a cylindrical revolutional surface the radius of which is different from that of a circle passing through the apices of the cutting edges of the blades.

9. A device according to claim 8, further characterized in that the difference between the two radii amounts to a few tenths of a millimeter.

10. A device according to claim 4, further characterized in that the ends of the blades are held at the bottoms of the slots by means of a pair of elastomeric rings and a pair of elastomeric cheeks having grooves into which the end of the blades are inserted.

11. A device according to claim 1, further characterized in that the cutting blades are positioned in radially extending planes.

12. A device according to claim 1, further characterized in that the blades are inclined with respect to the axis of rotation of the blade-bearing drum at an angle falling between 10° and 30°.

13. A device according to claim 3, further characterized in that the surface of the bearing member is covered with a layer of elastomer identical with the elastomer constituting the fin ring.

14. A device according to claim 1, further characterized in having a blade without a cutting edge positioned between circumferentially spaced blades having a cutting edge and wherein the height of the blade without the cutting edge is such that it does not touch the surface of the bearing drum in the cutting area whereby the length of said sections of thread are modified.

* * * * *